(No Model.)

W. H. WRIGHT.
NUT LOCK.

No. 341,983. Patented May 18, 1886.

WITNESSES:

INVENTOR
William H. Wright
By Wiles & Greene
ATTORNEYS.

UNITED STATES PATENT OFFICE.

WILLIAM H. WRIGHT, OF FREEPORT, ILLINOIS, ASSIGNOR OF ONE-HALF TO ORIN CROCKER, OF SAME PLACE.

NUT-LOCK.

SPECIFICATION forming part of Letters Patent No. 341,983, dated May 18, 1886.

Application filed February 1, 1886. Serial No. 190,470. (No model.)

*To all whom it may concern:*

Be it known that I, WILLIAM H. WRIGHT, a resident of Freeport, in the county of Stephenson and State of Illinois, have invented certain new and useful Improvements in Nut-Locks; and I do hereby declare the following to be a full, clear, and exact description of the invention, such as will enable others skilled in the art to which it pertains to make and use the same.

My invention is fully described and explained in this specification, and shown in the accompanying drawings, to which reference is had by letters, and in which—

Figure 1:
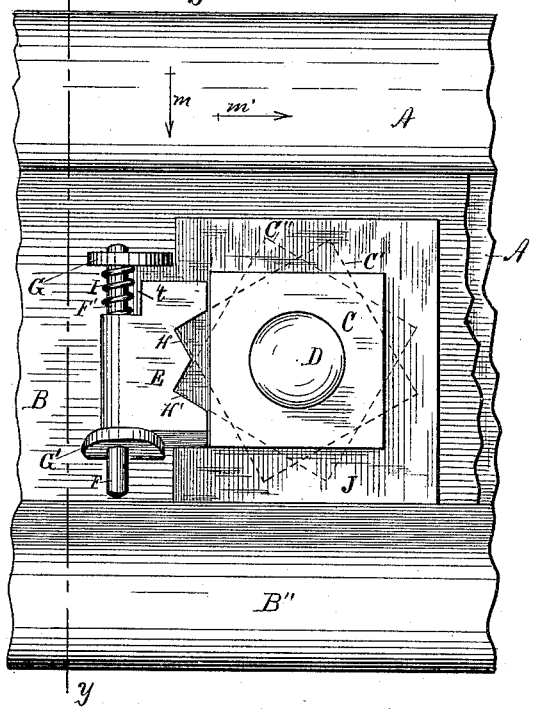
Figure 2:
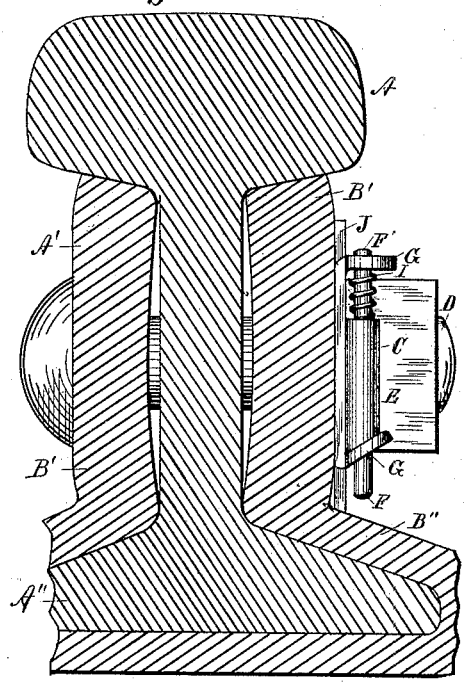
Figure 3:
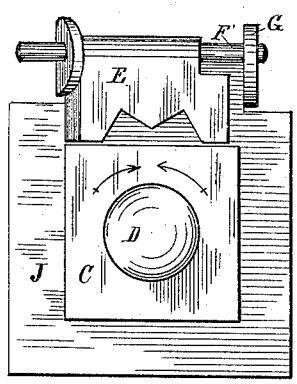
Figure 4:
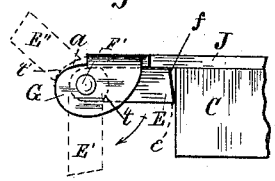

Figure 1 is a side elevation of an ordinary T-rail with fish-plates, and a bolt having a nut secured against rotation by my devices. Fig. 2 shows the same parts, seen in the direction of the arrow $m$, Fig. 1, the rail and fish-plates being cut on the line $x y$. Fig. 3 is similar to Fig. 1, the locking devices, however, being rotated ninety degrees to the right. Fig. 4 is a view in the direction of the arrow $m'$, Fig. 1, the rail, plates, bolt, and a portion of the washer J and of the nut C being omitted.

The object of my invention is to provide a nut-lock that shall be positive in its action, that locks the nut at practically any point in the rotation thereof, is not destroyed when the nut is removed, and that requires no special form in either bolt or nut.

In Fig. 1, A A is a T-rail; B, a fish-plate; D, a bolt; C, a nut to be locked; E, a locking-block; F F' pintles working in bearings in the ears G G', which are formed integrally with the washer J; I, a spring acting against the block E to keep it in contact with the ear G' and reacting against the ear G; H H', notches in the edge of the block, and B'' a sleeve inclosing the flanges at the bottom of the rail. The washer J is preferably rectangular in general outline, and is of such dimensions that the lower edge, in any of its positions, rests upon or nearly in contact with the sleeve B'', or upon the flange of the rail when no sleeve is employed. The ear G is perpendicular to the plane of the washer, while the ear G' is inclined upward. The lower edge of the block E is beveled to correspond with this inclination of the ear, so that the outward rotation of the block causes it to rise bodily, compressing the spring I. When such rotation is slight, the elastic force of the spring tends to press the block down this inclined surface of the ear and to restore it to its original position.

Fig. 2 shows the inclination of the ear G', and also the thickness and relative position of most of the members seen in Fig. 1.

In Fig. 3 the device is shown with the block on the upper side of the nut, and the spring I is omitted, gravity being depended upon to keep the block in place. It may also be dispensed with in the position of the lock illustrated in Fig. 1, gravity and the inclination of the ear G' being sufficient to keep the block in place.

It is to be observed that in any position loosening of the nut by rotation tends to throw the block against the ear G', since the motion of the impinging surface or angle of the nut is toward that ear; also that in certain positions of the nut—as, for example, when upon the lower end of a vertical bolt—the spring is indispensable.

The notches H H', whether one or more, are so placed that the nut may be locked at equal angular intervals in its rotation, as indicated in Fig. 1, wherein the dotted lines show positions of the nut when locked. The faces in each notch are at right angles to each other and intersect in a line whose distance from the center of the bolt D equals the semi-diagonal of the nut. Without these notches the nut must rotate ninety degrees between successive lockings, and hence the nut must often be left in imperfect contact with the washer or the bolt-threads be overstrained. With these notches the angular displacement of the nut between locking-points is so slight that it may be locked whenever, in screwing down the nut, the contact becomes practically perfect.

The ear G is of the form shown in Fig. 4. Except near the point $a$, the distance of its perimeter from the center of the pintle F exceeds the distance of the face $t$ of the recess in which the spring I lies from that point; therefore the ear prevents the removal of the block unless the latter be rotated to the position E'', or more than one hundred and eighty degrees. In that position the block may be raised the depth of the recess, permitting enough motion to free the pintle F from the ear G', when the block may obviously be removed. By reversing the operation the block may be replaced. Now, if the washer J is in the position shown in Figs. 1, 2, with the nut in place, the block, in its rotation above described, meets the plate B' before reaching the position E'', Fig. 4, or, in other words, the block cannot be detached when the device is in use. Fig. 4 also shows at $f$ that the contact-faces of the block are beveled back to allow its free rotation, even when the outer angle of its contact-face $t$ meets the surface of the nut.

I am aware that it is not new in nut-locks to combine with a non-rotatable washer a locking-plate hinged to the washer, and a spring acting on the locking-plate and adapted to force the same into a position in which it shall be locked with reference to the washer. I do not, therefore, claim such a combination, broadly; but,

Having now described my invention, what I claim is—

1. The combination of the washer J, having ears G G', and the locking-block E, having oppositely-projecting pintles F F', journaled in said ears, respectively, and having also a recess whose face $t$ is parallel with the pintle F, the ear G being a cam adapted to permit said recess to pass it when the block is rotated more than one hundred and eighty degrees from a position in absolute contact with the face of the washer, thus allowing the disconnection of the pintle F' from the ear G', substantially as and for the purpose set forth.

2. The combination of the washer J, formed with ears G G', the locking-block E, having oppositely-projecting pintles F F', journaled in said ears, respectively, and the spring I, coiled about the pintle F and pressing the locking-block away from the ear G and toward the ear G', the block being formed with a recess, $t$, whose face is parallel with the pintle F, and the ear G being a cam adapted to permit the passage of the recess when the block is rotated more than one hundred and eighty degrees from contact with the washer, whereby the block may be disconnected from the washer, and such disconnection is resisted by the spring I.

In testimony whereof I have signed this specification in the presence of two subscribing witnesses.

WILLIAM H. WRIGHT.

Witnesses:
   CHAS. GILBERT,
   J. A. CRAIN.